United States Patent
Madheswaran

(10) Patent No.: US 9,414,542 B2
(45) Date of Patent: Aug. 16, 2016

(54) MINIMIZING BEARING FAILURE DUE TO STALK ROLL MISALIGNMENT

(71) Applicant: AGCO Corporation, Hesston, KS (US)

(72) Inventor: Marudhu Madheswaran, Hesston, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 14/701,697

(22) Filed: May 1, 2015

(65) Prior Publication Data

US 2015/0319927 A1  Nov. 12, 2015

Related U.S. Application Data

(60) Provisional application No. 61/989,566, filed on May 7, 2014.

(51) Int. Cl.
| | | |
|---|---|---|
| *A01D 45/02* | (2006.01) | |
| *A01D 57/22* | (2006.01) | |
| *A01B 71/04* | (2006.01) | |

(52) U.S. Cl.
CPC ............ *A01D 45/025* (2013.01); *A01B 71/04* (2013.01); *A01D 57/22* (2013.01)

(58) Field of Classification Search
CPC ....... A01D 45/025; A01D 57/22; F16C 13/02; F16C 19/18
USPC ..................... 56/105, 110; 384/512
See application file for complete search history.

(56) References Cited

U.S. PATENT DOCUMENTS

| | | | | | |
|---|---|---|---|---|---|
| 1,645,345 A | * | 10/1927 | Okner | ............ | F16C 19/182 384/497 |
| 1,742,553 A | * | 1/1930 | Motte | ............ | D01H 5/56 384/497 |
| 1,976,705 A | * | 10/1934 | Glynn | ............ | B23B 5/56 82/11 |
| 2,180,594 A | * | 11/1939 | Kuhlman | ............ | A01D 45/025 241/DIG. 30 |
| 2,318,291 A | * | 5/1943 | Christiance | ............ | A01D 45/028 56/14.2 |
| 2,334,945 A | * | 11/1943 | Mitchell | ............ | A01D 45/025 56/104 |
| 2,618,113 A | * | 11/1952 | Hyman | ............ | A01D 45/025 460/29 |
| 2,927,414 A | * | 3/1960 | Jones | ............ | A01D 45/025 460/29 |
| 3,101,579 A | * | 8/1963 | Karlsson | ............ | A01D 45/021 56/105 |
| 3,271,940 A | * | 9/1966 | Ashton | ............ | A01D 41/141 56/105 |
| 3,304,702 A | * | 2/1967 | Russell | ............ | A01D 45/025 56/104 |
| 3,600,876 A | * | 8/1971 | Tanzer | ............ | A01D 45/025 56/104 |

(Continued)

FOREIGN PATENT DOCUMENTS

DE  19811156 A1 *  9/1999  ........... A01D 45/025

OTHER PUBLICATIONS

SKF Group, Bearings Products Webpage located at: http://www.skt.com/group/products/bearings-units-housings/ball-bearings/self-aligning-ball-bearings/index.html.

(Continued)

*Primary Examiner* — Árpád Fábián-Kovács

(57) ABSTRACT

A corn header has a plurality of row units disposed adjacent each other. Each row unit has a frame and a gearbox coupled to the frame. The gearbox has a gearing assembly coupled to a rotatable shaft extending from an opening of the gearbox. Each row unit also has a stalk roll coupled to the rotatable shaft and a coupling interface comprising a self-aligning ball or roller bearing assembly. A support bracket is secured to the frame with the coupling interface operably coupling the stalk roll to the support bracket within a defined tolerable limit of misalignment.

11 Claims, 5 Drawing Sheets

(56) References Cited

U.S. PATENT DOCUMENTS

| | | | | |
|---|---|---|---|---|
| 3,831,356 A * | 8/1974 | Maiste | .................. | A01D 45/021 56/10.3 |
| 3,858,384 A * | 1/1975 | Maiste | .................. | A01D 45/025 56/104 |
| 4,219,990 A * | 9/1980 | Hill | ...................... | A01D 45/025 56/104 |
| 4,233,804 A * | 11/1980 | Fischer | ................ | A01D 45/025 56/104 |
| 7,930,870 B2 * | 4/2011 | Rottinghaus | ......... | A01D 45/021 56/104 |
| 8,220,235 B2 * | 7/2012 | Kowalchuk | .......... | A01D 45/021 56/62 |
| 8,402,727 B2 * | 3/2013 | Carboni | ............... | A01D 45/021 56/60 |
| 8,820,039 B2 * | 9/2014 | Werning | .............. | A01D 45/021 460/5 |

OTHER PUBLICATIONS

SKF Group, Technical Information Leaflet, Seal Products Brochure located at: http://www.skf.com/group/knowledge-centre/media-library/index.html#tcm:12-138928.

* cited by examiner

US 9,414,542 B2

MINIMIZING BEARING FAILURE DUE TO STALK ROLL MISALIGNMENT

CROSS REFERENCE TO RELATED APPLICATION

This application claims the benefit of U.S. Provisional Application No. 61/989,566, entitled MINIMIZING BEARING FAILURE DUE TO STALK ROLL MISALIGNMENT filed May 7, 2014, which is hereby incorporated by reference in its entirety.

BACKGROUND OF THE INVENTION

1. Field of Invention

The present disclosure is generally related to headers for agricultural machines and, more particularly, is related to stalk rolls for corn headers.

2. Description of Related Art

Agricultural harvesters such as combines are typically equipped with a harvesting header. For instance, corn headers are specifically designed to pick up corn, and vary in size (e.g., two row units, twelve row units, etc.). As the harvester moves through the field, each row unit passes between rows of corn. Corn header row units typically use gathering chains or other mechanisms to convey plant material and ears rearward toward a cross auger. A set of gearbox driven stalk rolls, which may rotate based on the speed of the harvester, grabs the corn stalks and forces them downward between stripper plates. The ears of corn are snapped free of the stalk, conveyed by the gathering chains toward the cross auger, and the cross auger passes the ears of corn to the feeder housing of the harvester.

Given the cantilever design of the stalk rolls, tolerance stack ups and/or misalignment from the output shaft of the gearbox may impact the angular tolerance of the stalk rolls, which may require manual adjustment to accommodate the misalignment.

OVERVIEW OF THE INVENTION

In one embodiment, the invention is directed to a corn header having a plurality of row units disposed adjacent each other. Each row unit has a frame and a gearbox coupled to the frame. The gearbox has a gearing assembly coupled to a rotatable shaft extending from an opening of the gearbox. Each row unit also has a stalk roll coupled to the rotatable shaft and a coupling interface comprising a self-aligning ball or roller bearing assembly. A support bracket is secured to the frame with the coupling interface operably coupling the stalk roll to the support bracket within a defined tolerable limit of misalignment.

In another embodiment is directed to a method including rotating a stalk roll using a gearbox, the stalk roll arranged fore and aft relative to the gearbox, and accommodating misalignment in the rotating stalk roll using a self-aligning ball bearing assembly located proximal to the fore end.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
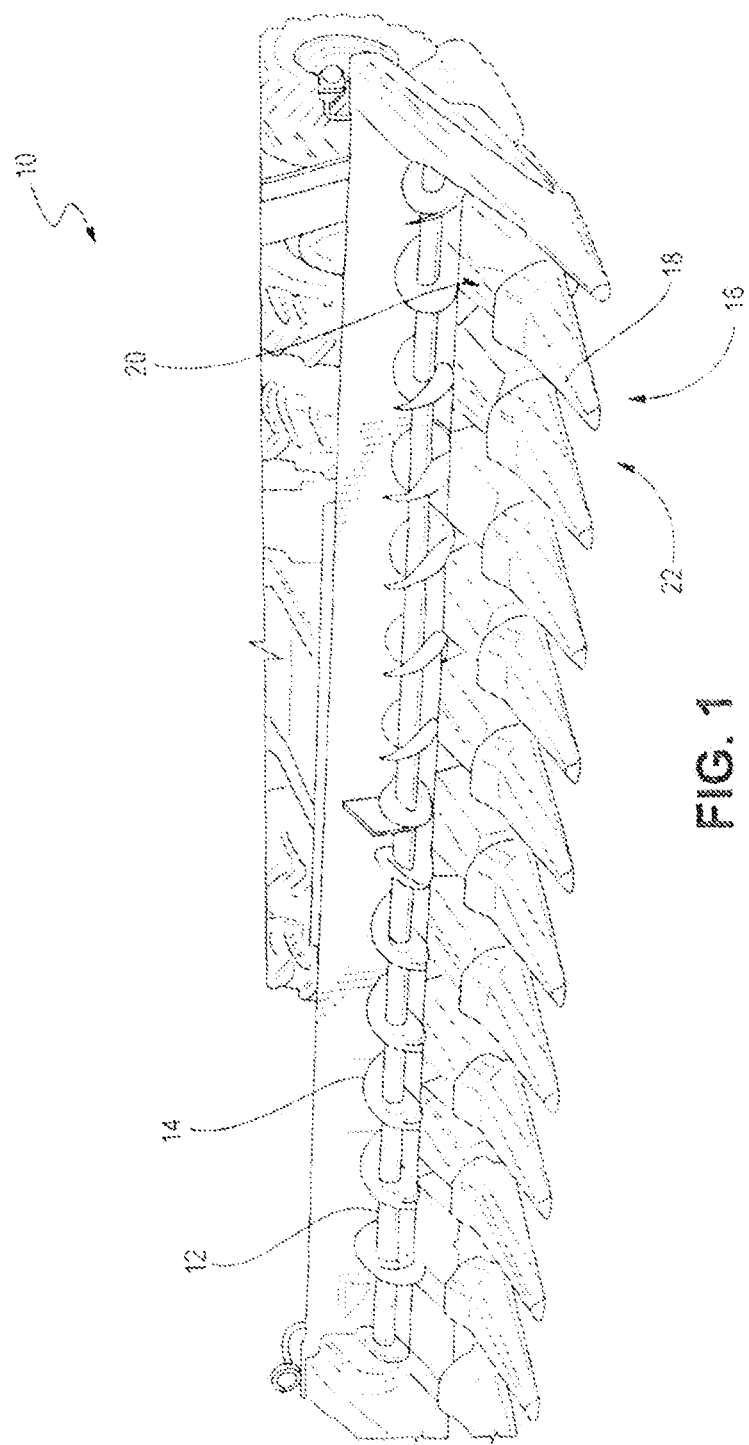
FIG. 1 is a schematic diagram showing a front perspective view of an example corn header with plural row units in which an embodiment of a stalk roll misalignment accommodation system may be deployed.

Certain embodiments of a stalk roll misalignment accommodation system and method for a corn header and associated row units and stalk rolls are disclosed that include a coupling interface to compensate for manufacturing tolerances often found with the cantilever design of today's stalk rolls. In one embodiment, the coupling interface is disposed proximally to the fore end of each stalk roll, and comprises a self-aligning ball bearing assembly that accommodates certain angular tolerances resulting from stacked tolerances and/or misalignment of output shafts of a gearbox of a row unit. In some embodiments, an associated cap and seal of the coupling interface enables further integrity of stalk roll function within the tolerance accommodation limits.

Digressing briefly, conventional row units use a standard bearing assembly to support the stalk roll, with the accommodation of stalk roll misalignment handled through manual adjustment. In contrast, certain embodiments of stalk roll misalignment accommodation systems eliminate or mitigate the need for manual adjustment through the use of a self-aligning ball bearing assembly at the fore end of the stalk roll.

Having summarized certain features of a stalk roll misalignment accommodation system of the present disclosure, reference will now be made in detail to the description of the disclosure as illustrated in the drawings. While the disclosure is described in connection with these drawings, there is no intent to limit it to the embodiment or embodiments disclosed herein. For instance, though described in the context of row units having stalk rolls with a certain arrangement of features, it should be appreciated that other designs of row units may similarly benefit, and hence are contemplated to be within the scope of the disclosure. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is a front perspective view of an example corn header 10 with plural row units located adjacent each other across the width of the header 10, in which an embodiment of a stalk roll misalignment accommodation system may be deployed. The corn header 10 may be coupled to the front of an agricultural harvester, such as a combine harvester, as is known to those having ordinary skill in the art. The corn header 10 comprises a cross auger 12 with spiral flighting 14 for sweeping the ears of corn toward the center of the header 10. Large cross augers 12 may also have paddles, fingers, or some other structures to facilitate the delivery of the crop rearward to a feeder housing of the combine harvester. The header 10 has a plurality of forward-extending divider assemblies 16, each divider assembly comprising a snout 18 and gatherer hood 20. The header 10 also comprises a plurality of forward extending row units 22, each row unit comprising a set (e.g., pair) of stalk rolls that operate in opposing rotation. In one embodiment, each row unit 22 comprises a stalk roll misalignment accommodation system, which comprises a coupling interface associated with the fore end of each fore and aft stalk roll. In some embodiments, the coupling interface may be omitted in one or more row units 22, and in some embodiments, the coupling interface may be omitted in one of the pair of stalk rolls of a row unit 22. Further description of the coupling interface is set forth below. One roll of the pair of stalk rows is associated with (e.g., covered by) one of the divider assemblies 16, whereas the other roll of the pair of stalk rolls is associated with an adjacent divider assembly 16. In other words, a divider assembly 16 may cover two stalk rolls from adjacent row units 22.

The row units 22 and the cross auger 12 define a feeder plane therebetween where useable parts of stalk crops are conveyed rearward from the row units 22 to the cross auger 12. One having ordinary skill in the art should appreciate in the context of the present disclosure that the number of row units 22 may differ among different types of corn headers, and that other configurations of corn headers with or without a different quantity of row units are contemplated to be within the scope of the disclosure.

Figure 2:
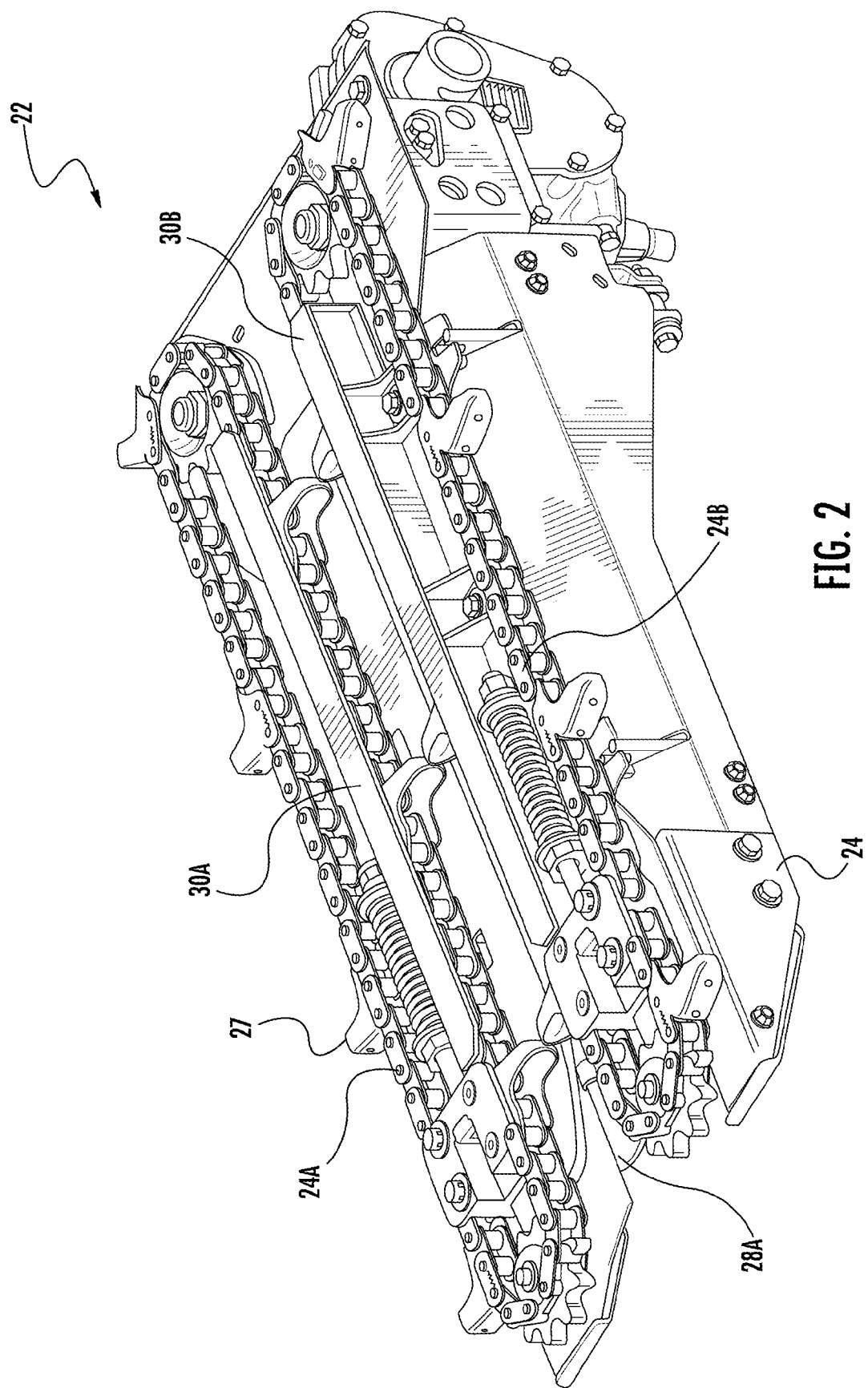
FIG. 2 is a schematic diagram of an example embodiment of a row unit in top perspective view in which an embodiment of a stalk roll misalignment accommodation system may be deployed.

Referring to FIG. 2, shown in front perspective, top view, is an example embodiment of a row unit 22. The row unit 22 comprises a frame 24, to which is secured various sub-components. The row unit 22 comprises a set of counter-rotatable, gathering chains 26A, 26B for conveying harvested plant material, such as ears of corn, rearwardly toward the cross auger 12 (FIG. 1). In some embodiments, other mechanisms for conveying the plant material rearwardly may be used, such as one or more augers. As is known, the gathering chains 26A, 26B each comprise plural lugs, such as lug 27, to facilitate the rearward conveyance process. Obscured from view are a pair of stalk rolls of the row unit 22, the stalk rolls illustrated in FIG. 3A.

Figure 3:
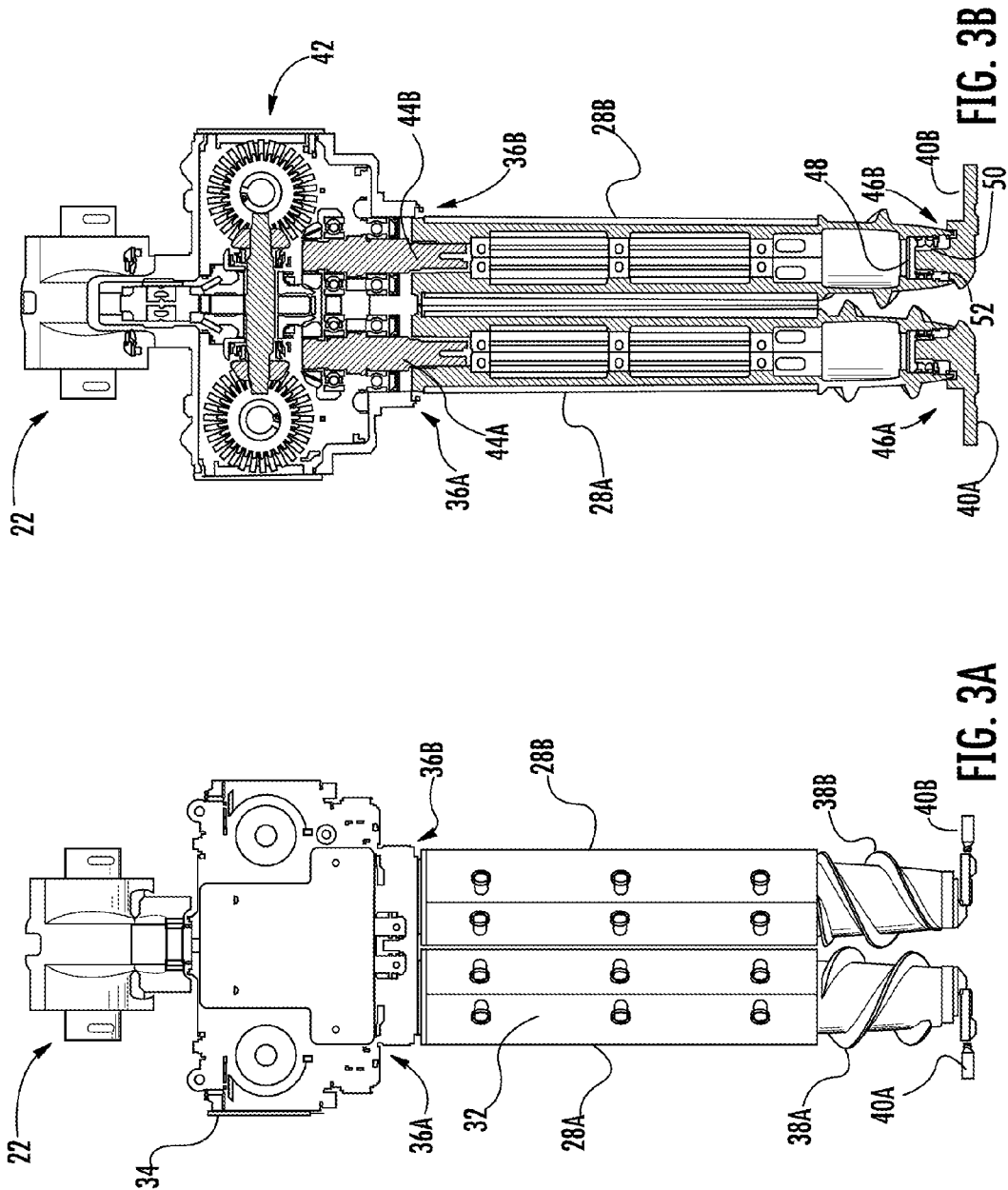
FIG. 3A is a schematic diagram showing in overhead plan, fragmentary view select portions of an embodiment of a row unit in which an embodiment of a stalk roll misalignment accommodation system may be deployed.
FIG. 3B is a schematic diagram showing in overhead plan, fragmentary, cut-away view select portions of an embodiment of the row unit of FIG. 3A.

FIG. 3A is a fragmentary, overhead plan view of the row unit 22 with the gathering chains 26A, 26B and other associated componentry shown in FIG. 2 removed in FIG. 3A. As best seen in FIG. 3A, with continued reference to FIG. 2, the row unit 22 comprises a pair of opposably rotatable (e.g., counter-rotating) stalk rolls 28A, 28B disposed beneath the gathering chains 26A, 26B. The stalk rolls 28A and 28B are illustrated in FIG. 3A with knives, such as knife 32, secured (e.g., via bolts or other securing mechanisms) to an underlying cast structure as is known. The knives 32 facilitate engagement with plant material, though some embodiments may use stalk roll configurations. In general, the stalk rolls 28A, 28B are operable for pulling the plant material (e.g., stalks, leaves, ears of corn, etc.) downwardly and rearwardly, such that ears of corn are stripped by stripper plates 30A, 30B (shown in FIG. 2), enabling the ears of corn to be conveyed rearward. Also, the stalk rolls 28A, 28B chop and slice the residue to ultimately be discharged to the ground. The row unit 22 also comprises a gearbox 34. The gearbox 34 comprises a cast body or frame, within which comprises known gearing assemblies to drive, via output shafts extending through openings 36A, 36B located proximal the aft end of the stalk rolls 28A, 28B, the rotation of the stalk rolls 28A, 28B. The stalk rolls 28A and 28B include respective helical flute portions 36A, 38B at the fore end of the stalk rolls 28A, 28B to facilitate engagement of the plant material. The respective helical flute portions 38A and 38B are coupled at the fore end to support brackets 40A, 40B, respectively, which in turn are secured to the frame 24 (FIG. 2).

Reference is now made to FIG. 3B, which shows in cutaway, fragmentary view, some of the internal features of the row unit 22 of FIG. 3A. At the gearbox 34, a known gearing assembly 42 drives output shafts 44A and 44B. The output shafts 44A, 44B extend through respective openings 36A, 36B and couple (e.g., via a splined connection) to respective stalk rolls 28A, 28B in known manner. The coupling of the output shafts 44A, 44B to respective stalk rolls 28A, 28B enables a translation of rotation of the output shafts 44A, 44B to the respective stalk rolls 28A, 28B. The stalk rolls 28A, 28B are respectively coupled at the fore end in known manner to the support brackets 40A, 40B via respective coupling interfaces 46A, 46B. Focusing on coupling interface 46B (with the same or similar applicability to, and description for, coupling interface 46A), the coupling interface 46B comprises a cap 48 disposed adjacent the fore end of the stalk roll 28B. The cap 48 is comprised of plastic material, though other material such as steel, rubber, or any combination (with or without plastic) thereof may be used in some embodiments. The cap 48 may protect the other portions of the coupling interface 46B from contaminants introduced at the gearbox 34. The coupling interface 46B further comprises a self-aligning ball bearing assembly 50. Self-aligning ball bearing assemblies are known in the art, and typically comprise an inner ring and two (2) rows of balls (or in some embodiments, spherical rollers) contained within an outer ring that has a common spherical raceway, where an axis of the inner ring, the balls, and cage can deflect a defined tolerance around the bearing center to provide a self-aligning feature (e.g., permitting angular misalignment of the stalk roll, such as accommodating a misalignment of approximately 1½ degrees while maintaining the operational integrity of the stalk roll 28B). It should be appreciated that, depending on the design and intended conditions of operation, self-aligning ball bearing assemblies enabling larger angular misalignment may be deployed, and hence are contemplated to be within the scope of the disclosure. In one embodiment, the self-aligning ball bearing assembly 50 may be lubricated (e.g., with grease) and sealed (e.g., doubly-sealed), and may be comprised of any of one a plurality of different material constructions (e.g., polyamide cage, metal, steel balls, ceramic balls, etc.). Example self-aligning ball bearing assemblies include those manufactured by SKF (e.g., 2200 Series), NSK, AST, among other manufacturers of self-aligning ball bearings or their variants (e.g., instead of balls, spherical rollers, rod ends, etc.). In one embodiment, the coupling interface 46B further comprises a seal 52 (also known as a mud block seal or mud seal) disposed between the self-aligning ball bearing assembly 50 and the support bracket 40B. The seal 52 serves to prevent contaminants from affecting operation of the self-aligning ball bearing assembly 50 and may facilitate the misalignment accommodation of the self-aligning ball bearing assembly 50. The seal 52 may comprise a spherical design constructed of a metal insert seal and sleeve, rubber seal and sleeve, and steel garter spring. Examples of seals include those manufactured by SKF (e.g., mudblock series or variants thereof). It should be appreciated by one having ordinary skill in the art in the context of the present disclosure that the structures of the coupling interface 46B (and 46A) may vary in some embodiments, for instance where the cap 48 and/or seal 52 (or type of seal) may be omitted in some embodiments, or be constructed of different materials.

Figure 4:
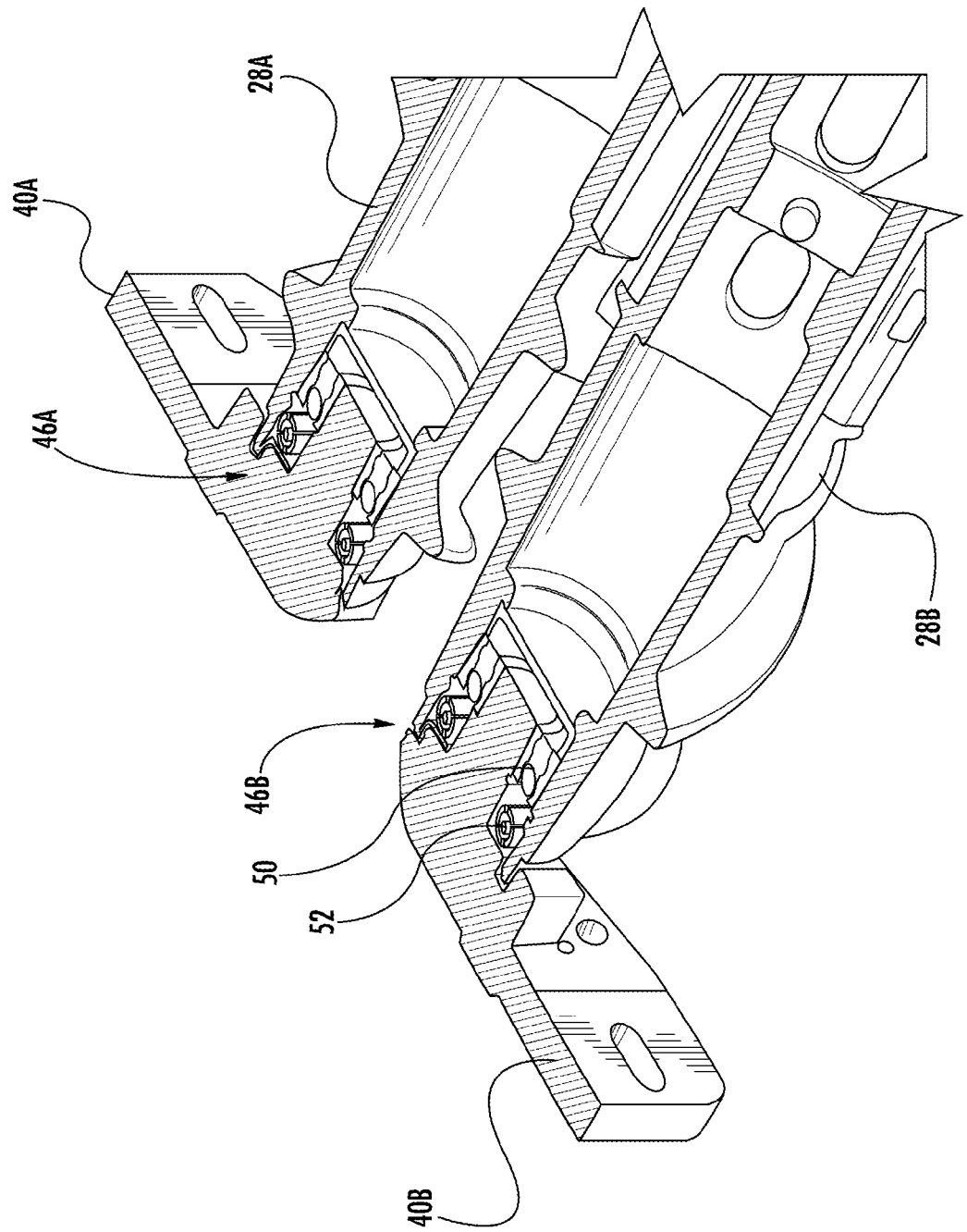
FIG. 4 is a schematic diagram showing a partial perspective, cut-away view of an embodiment of coupling interface for an embodiment of a stalk roll misalignment accommodation system.

Attention is directed to FIG. 4, which illustrates in cutaway perspective view the fore end of the stalk rolls 28A, 28B, showing further the coupling interfaces 46A and 46B relative to the support brackets 40A, 40B and the fore end of the stalk rolls 28A, 28B, respectively. Also shown is the self-aligning ball bearing assembly 50 and the adjacent seal 52.

Figure 5:
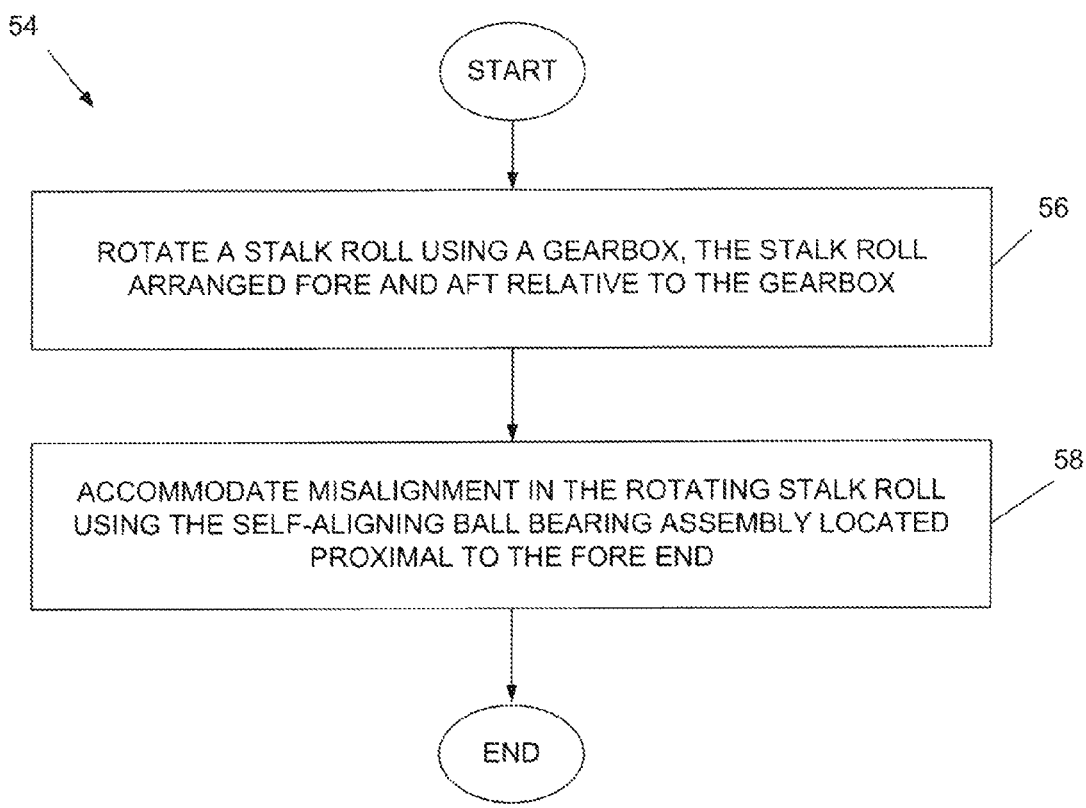
FIG. 5 is a flow diagram that illustrates an example embodiment of a stalk roll misalignment accommodation method.

Having described some example embodiments of a stalk roll misalignment accommodation system, it should be appreciated in view of the present disclosure that one embodiment of a stalk roll misalignment accommodation method 54, depicted in FIG. 5, comprises rotating a stalk roll using a gearbox, the stalk roll arranged fore and aft relative to the gearbox (56); and accommodating misalignment in the rotating stalk roll using the self-aligning ball bearing assembly located proximal to the fore end (58). Note that in some embodiments, additional steps may be employed by a row unit in some embodiments.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A row unit for a corn header comprising:
   a frame;
   a gearbox coupled to the frame, the gearbox having a gearing assembly coupled to a rotatable shaft extending from an opening of the gearbox;
   a stalk roll having first and second ends, the first end coupled directly to the rotatable shaft, the second end coupled via a coupling interface to a support bracket, the support bracket coupled to the frame; and
   a self-aligning ball bearing assembly located at the coupling interface, the self-aligning ball bearing assembly compensating for misalignment between the first end and the second end;
   a cap disposed between the self-aligning ball bearing assembly and the second end; and
   a seal disposed between the self-aligning ball bearing assembly and the support bracket such that the self-aligning ball bearing assembly is sandwiched between the cap and the seal.

2. The row unit of claim 1, wherein the cap comprises a plastic material.

3. The row unit of claim 1, wherein the seal is comprised of rubber and metal material and is cylindrical in shape.

4. The row unit of claim 1, wherein the self-aligning ball bearing assembly comprises two rows of balls and a common sphered raceway.

5. The row unit of claim 1, wherein the self-aligning ball bearing assembly is designed to accommodate a maximum misalignment of approximately one and one-half (1½) degrees.

6. The row unit of claim 1, further comprising:
   a second rotatable shaft coupled to the gearing assembly and extending from a second opening of the gearbox;
   a second stalk roll having first and second ends, the first end coupled directly to the second rotatable shaft, the second end coupled via a second coupling interface to a second support bracket, the second support bracket coupled to the frame; and
   a second self-aligning ball bearing assembly located at the second coupling interface, the second self-aligning ball bearing assembly compensating for misalignment between the first end and the second end of the second stalk roll.

7. The row unit of claim 6, wherein the second coupling interface further comprises a cap and a seal, the self-aligning ball bearing assembly sandwiched between the cap and the seal, the cap disposed adjacent the second end of the second stalk roll.

8. A corn header, comprising:
   a plurality of row units disposed adjacent each other, each row unit comprising:
      a frame;
      a gearbox coupled to the frame, the gearbox having a gearing assembly coupled to a rotatable shaft extending from an opening of the gearbox;
      a stalk roll coupled to the rotatable shaft;
      a coupling interface comprising a self-aligning ball or roller bearing assembly; and
      a support bracket secured to the frame, the coupling interface operably coupling the stalk roll to the support bracket within a defined tolerable limit of misalignment;
      a cap disposed adjacent the self-aligning ball or roller bearing assembly; and
      a seal disposed between the self-aligning ball or roller bearing assembly and the support bracket such that the self-aligning ball bearing assembly isسandwiched between the cap and the seal.

9. The corn header of claim 8, wherein the cap comprises a plastic material.

10. The corn header of claim 8, wherein the seal is comprised of rubber, metal, or a combination of rubber and metal material.

11. The corn header of claim 8, wherein the defined tolerable limit of misalignment is approximately one and one-half (1½) degrees.

* * * * *